(12) United States Patent
Pan et al.

(10) Patent No.: US 10,504,144 B2
(45) Date of Patent: Dec. 10, 2019

(54) INTELLIGENT ONLINE ACCOUNT LIFECYCLE MAINTENANCE THROUGH AUTOMATED EVENT MONITORING

(71) Applicant: PAYPAL, INC., San Jose, CA (US)

(72) Inventors: Feng Pan, San Jose, CA (US); Jing Chen, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 378 days.

(21) Appl. No.: 15/291,821

(22) Filed: Oct. 12, 2016

(65) Prior Publication Data

US 2018/0101865 A1 Apr. 12, 2018

(51) Int. Cl.
*G06Q 30/02* (2012.01)

(52) U.S. Cl.
CPC ..... *G06Q 30/0255* (2013.01); *G06Q 30/0269* (2013.01)

(58) Field of Classification Search
None
See application file for complete search history.

(56) References Cited

U.S. PATENT DOCUMENTS

| 8,015,114 B1 * | 9/2011 | Nachenberg | G06F 21/564 705/59 |
| 2008/0250323 A1 * | 10/2008 | Huff | G06F 9/453 715/733 |

FOREIGN PATENT DOCUMENTS

WO  WO-2016093870 A1 *  6/2016  ......... G06F 17/3053

* cited by examiner

*Primary Examiner* — Alexandru Cirnu
(74) *Attorney, Agent, or Firm* — Haynes and Boone LLP (57) ABSTRACT

There are provided systems and methods for intelligent online account lifecycle maintenance through automated event monitoring. A user may utilize an online account with the service provider to perform various actions and generate account usage data. Based on the account usage data, such as a length the account has been in service, amount the account is used, and other lifecycle data for the account, a user action may be taken with respect to the account. For example, the user action may correspond to a recommendation for the user for a feature that the user may utilize with the account that other similar users utilize, but the user does not. The recommendation may be based on whether the user is a new or ongoing user. A communication channel to send the action to the user may be determined based on a most likely to view channel.

20 Claims, 5 Drawing Sheets

INTELLIGENT ONLINE ACCOUNT LIFECYCLE MAINTENANCE THROUGH AUTOMATED EVENT MONITORING

TECHNICAL FIELD

The present application generally relates to online account optimization, and more specifically to intelligent online account lifecycle maintenance through automated event monitoring.

BACKGROUND

Multiple types of online entities may provide accounts for users, including service providers, messaging services including email and instant messaging services, social networking platforms, and/or media sharing platforms. Use of these services may require a user to sign up, where the user is entitled to utilizes various services provided by the online entity based on their account and/or account status. For example, the entities may provide multiple types of services, which may be dependent on a user's status with the entity, payments to the entity, or ranking system the entity establishes. However, when a user first signs up for an account, the user may be overwhelmed by the options, and may not understand what the user should select based on their personal preferences. Moreover, new customers may be unaware of certain features that the entity may provide. Additionally, as users continue to use features and services of the entity, the user may find it difficult to follow new features, or may lose interest in the account based on features the user would like, but the user finds elsewhere. Often the entities provide such features, but users that are not well integrated do not understand or know of such features. Thus, the entities may wish to reduce churn rate, or the amount or percentage of lost customers that discontinue use of their account. However, without understanding how to manage a user's online account, experience, and persona, the entity may be unable to reduce such issues in lost user base.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for intelligent online account lifecycle maintenance through automated event monitoring. Systems suitable for practicing methods of the present disclosure are also provided.

According to various embodiments, a user may establish an account with a service provider, where the account allows the user to utilize various services provided by the service provider, including messaging services, transaction processing services, social networking services, media sharing services, email services, and/or other type of online activity that the user may wish to engage in using the service provider. The service provider may provide lifecycle maintenance of the account through analysis of past trend data for the user and other users of the service provider. Additionally, the service provider may determine a "best" electronic communication channel to transmit maintenance updates to the user, where the "best" channel may be selected based on any number of measurable metrics, such as visibility, response rate, time-to-opening the message, time to respond to the message, rate of deletion before reading the message, amount of time spent on the message before taking an action, such as deleting, forwarding, or responding, and/or other factors that may indicate that the user is likely to view, click-through, or otherwise respond to the update. In this regard, the maintenance updates may correspond to an account action take with respect to the user's account, which may include addition of a feature, advertisement for the feature, removal of the feature, policy update, fee or cost changes or updates, newly added feature information, and/or removal of a past available feature.

In order to establish an account, a user may be required to provide information to a service provider to generate the account. With regard to a service provider offering transaction processing services, one or more users may wish to engage in electronic transaction processing with one or more other entities, such as merchants or other users. For example, a user may wish to provide a payment to a merchant for a transaction, such as a purchase of one or more items, a bill payment, or other type of required payment or transfer of money by the user to the merchant. Various service providers may provide transaction processing services that may allow two or more entities (e.g., personal users, groups of users, merchants, etc.) to engage in electronic processing for a transaction. For example, a transaction processor service may offer transaction processing services that provide transfers, payment services, reimbursement or refund services, and other type of financial services. These service providers may further provide the aforementioned account services, which may be utilized through a digital wallet service, for example, to store one or more financial instruments of the user for use in transaction processing and provide a digital wallet that may be utilized to perform transaction processing through tokenized payment services.

Thus, a user in order to establish the account, the user may be required to provide personal, business, or other identification information, such as a name, address, social security number, driver's license, and/or other information. The user may also be required to provide financial information, including payment cards (e.g., credit/debit cards), bank account information, gift cards, and/or benefits/incentives, which may be utilized to provide payments or otherwise engage in processing of another transaction. In order to create an account, the user may be required to select an account name and/or provide authentication credentials, such as a password, personal identification number (PIN), security questions, and/or other authentication information. The service provider may utilize such information to create the account for the user, and provide the user with a digital wallet that allows for electronic transaction processing. The digital wallet may store the user's financial instruments of the user and allow the user to process transactions through the digital wallet. In this regard, the service provider may provide a digital token, such as a data package, that represents the digital wallet and may approve the digital wallet for processing of a transaction with the service provider to a device that receives the token. Thus, the token may include data identifying the digital wallet (e.g., a token), as well as authentication information including an identifier for user of the digital wallet, which may be encrypted.

Once an account is created, the account may be accessed through a web browser from a website of the service provider and/or a dedicated application of the service provider, such as a mobile smart phone application. Thus, the user may directly access the account through an electronic communication channel, for example, through sending data to and receiving data from the service provider through a web browser/dedicated application over a network connection with the service provider. However, the service provider may utilize further electronic communication channels, as discussed herein, where the service provider and/or the user may have integration with the alternative communication channels (e.g., website banners, emails, text messaging, social networking feeds, etc.). The user may engage in transaction processing through accessing their account and providing transaction information for the transaction. Thus, a digital token may be issued to the user for the user's accounts, where the token may include data (which may be encrypted) allowing the service provider to identify the user and the account, as well as authenticate the user. As such, the token may be transmitted to other entities during transaction processing, which may allow the service to identify and authenticate the user's account and engage in transaction processing. Thus, the accounts may store information associated with each user for use in transaction processing.

In this regard, a computing device for a user, such as a mobile smart phone, may further include a mobile payment application or more generally a transaction processing application, which may be configured to send and receive payments to another party, such as another user and/or a merchant, or otherwise engage in transaction processing. In various embodiments, a website may provide the transaction processing services, and thus may be accessed by a web browser application. The application (or website) may be associated with a payment provider, such as PayPal® or other online transaction processor service, which may provide payments and the other aforementioned transaction processing services on behalf of users, merchants, and other entities. The application may execute on the computing device for a user, and may provide various functionalities and processes to the user. For example, a user may utilize the application to send and/or receive payments between the user and another user/merchant for one or more items purchased in a transaction. In various embodiments, the processes and features described herein may be applied to a merchant account for a merchant, where the merchant may similarly send and/or receive payments between the merchant and another user/merchant, which may include receiving payment for transactions. Thus, the merchant may also receive account actions based on a merchant model/account lifecycle status, as described herein, through an electronic communication channel selected by the service provider based on visibility to the merchant.

The service provider may determine a user model for the user of the account, which may correspond to demographic features, account usage amounts and information, user online behavior (e.g., search engine searches, browsing, online transaction processing, etc.), real-world detected information (e.g., visited locations, processed transactions and purchases, detected biometrics, etc.), account information for the account, and/or user information for the user. Thus, the user model may be based on the user's information (e.g., age, location, or other demographic information, as well as real-world and/or online actions) and/or the user's account usage information (e.g., types of transactions engaged in, frequency of transactions, other accounts the user interacts with, messages sent/received, or other actions taken with the user's account). The user model may also be utilized to determine a lifecycle status for the account, which may be determined using account usage and/or lifecycle information, such as a time of enrollment in the account, amount of usage of the account, sophistication of the account usage, number of adopted features, and/or length since last use of the account. The lifecycle status may correspond to a point along a timeline from establishment of the account to deactivation or disuse of the account. For example, churn rate describes the rate or percentage of users that discontinue use. Thus, the lifecycle status may correspond to a point of a user from becoming a customer of the service provider to churn, or where the user actively or passively discontinues use of the service provider, such as canceling the account or allowing the account to expire (e.g., not changing a password or after a predetermined period of non-use). The user model and/or lifecycle status may be compared to similar other users having similar models and/or lifecycle status to determine the account action for the user. Additional information for the user and/or other users of the service provider may also be determined, such as viewed media sources by the user and/or other users, which may include a rate of response, click-through, or other effectiveness measurement for message or advertisements viewed through the media channel (including deletions or pass by of messages indicating the user did not view the message). Such outreach and effectiveness information for transmission of messages through the electronic communication channels available to the user may be used to determine the electronic communication channel to transmit the account action to the user, which may be specific to the user through analysis of past user behavior.

In order to provide account maintenance, the service provider may utilize an automated process to determine the user model for the user and/or lifecycle status for the account, which may be periodically and/or continuously updated, for example, in real-time depending on incoming data and events. The service provider may store the user model and/or the lifecycle status with the account, for example, included with account information and/or usage information for the account. The service provider may utilize the account information to determine the account action, such as a recommendation for the user. The recommendation may be in the form of an advertisement, such as an advertisement for a feature that the user may wish to adopt, or may be another type of notification that informs the user of the account action. In other embodiments, the account action may correspond to an alert, for example, a change in account availability, feature availability or usage, and/or change in account pricing or terms of service that may affect the user. In order to determine the account action, the service provider may analyze the user model and/or lifecycle data with historical user models and/or lifecycle data to determine other similar user's to the user, such as peer users. The service provider may determine what features are used across the other peers, for example, an adoption or usage rate or percentage for feature use of the service provider by the peers. The adoption rate may correspond to a rate at which the peers added or utilized a feature advertised to the peers, while the usage rate may correspond more generally to the feature usage by the peers, which may include the peers adding or using the feature without advertisement. In other embodiments, the service provider may determine what other information is relevant across the peer users, for example, through requests for information, information look-up/browsing, and/or complaint submissions by the peers.

For example, in certain embodiments the service provider may provide multiple different features, such as a free return on purchases feature/policy, a pay after delivery feature, extendable credit, a mobile application download, and/or a simplified checkout and payment processes, for example, through a "one-touch" process that keeps the user logged in to the service provider during a web browsing session (e.g., through a device side cookie or other device stored data) that allows the user to instantly purchase on other merchant websites through selection of the service provider as the transaction processing and payment service without further login to those other websites. The features may be free or may require a fee for addition to an account. For a first user, the service provider may select a free return feature to advertise to the user where the first user does not currently utilize the free return feature. Selection of the free return feature may be based on multiple past returns by the user, whether the user uses online shopping for items commonly returned (e.g., clothing), or other user information. Additionally, selection of the free return feature may be based on comparing the user model for the first user and account lifecycle data for the first user's account to other similar users, such as peer users that perform the same or similar transactions, online actions, or other information. In such embodiments, the peer users may utilize the free return feature, and thus the service provider may determine that the free return feature may be of interest to the first user. Thus, the account action for the first user may correspond to an advertisement to sign up for free returns using the service provider.

Similarly, a second user may utilize their account during web browsing sessions to purchase items from a plurality of different merchants in one web browsing session, but the second user logs into their account with each merchant website, increasing risk for the account and causing additional time. The second user's user model and/or account lifecycle information may be compared to other similar users that have signed up for the "one-touch" process to simplify checkout with multiple merchants in the same web browsing and shopping session. Thus, the service provider may determine that the account action for the second user corresponds to a recommendation to the user to install or add the "one-touch" feature to the user's computing device, or sign up/select during login to the service provider during a web browsing/shopping session, for use with the account to simplify checkout and payment. Once the service provider determines the account feature to take with respect to the user's account, the service provider may generate a recommendation, alert, or other notification to the user of the account feature. The notification may include information presented to the user of the feature for the user's account or other information associated with the account action, such as change in features, terms of service, or other information about why the user is being notified of the account action. Additionally, the notification may include information about how the account action was generated based on the user's model and/or account lifecycle, such as a comparison to other similar peer users and/or why the account action was generated.

Once the account action is generated, the service provider may be required to communicate the account action to the user using a communication channel. The communication channel may be determined based on the user's past actions, such as viewing and usage habits online communication platforms, as well as comparison of the user to other similar users and their viewing/usage habits of the online communication platforms. For example, statistical analysis of users in general may be used to determine a highest attention of effectiveness rate of communication through a specific channel, including email, messaging, banners within a website or dedicated application for the service provider, external webpage or application advertisement/notification for an entity other than the service provider, login webpage notifications, checkout or transaction processing webpage notifications, social networking feed, or other communication channel. Moreover, the attention or effectiveness rate may be broken down into like users having similar features, for example, viewing habits, user models, and/or account lifecycle status. For example, a communication channel may be selected for a particular user based on other users' response rates and/or viewing of notifications or other communications through the communication channel.

However, where historical data for the user is unavailable and/or additional confidence in selection of the communication channel is desirable, the user may be compared to similar users, for example, based on peer users that may be determined through the user model and/or account lifecycle status. In such embodiments, peer users may be used to determine what channels the peer users are most likely to view and/or respond to an account notification. Thus, if similar users to the user have a highest notification effectiveness rate of email, the account action may be communicated to the user through email. Moreover, a time that the similar users view the communication channel may be determined, where the account action may be communicated to the user at the particular time. For example, if the peer users view email at 9:00 AM, the account action may be communicated through email to the user at 9:00 AM similar to the peer users of the user. If the user is unresponsive to the account action or has not viewed the account action, another communication channel with a next highest effectiveness rate for the peer users may be determined and used.

In addition to the communication channel, a most effective time to communicate the account action along a communication channel may be determined based on the aforementioned information. For example, if the user's history indicates that the user takes a train to work from 8:15-8:45 every morning and checks their social networking feed during such time period, the account action may be posted to the user's social networking feed during such a time period. Such processing may select particular communication channels that are less effective than others but more likely to be viewed by the user at a particular time. Thus, if it is indicated that the user is most likely to respond to email advertisements, the social networking feed may still be selected between the aforementioned times to increase visibility. Thus, the timing of communication of the account action using the electronic communication channel may influence selection of the channel. The email advertisement may further be communicated to the user in further embodiments in order to increase coverage.

Additionally, the service provider may monitor user actions, other user actions including adoption or addition of features, and/or account lifecycle in order to update the user's model and/or account lifecycle. Such information may be used to determine future account actions and recommendations, which may be altered based on a changing user model and/or different lifecycle status for the user's account. Additionally, the user's viewed communication channels and response rates may be continuously monitored to determine whether a best electronic communication channel to transmit to the user an account action, as well as the best time.

Figure 1:
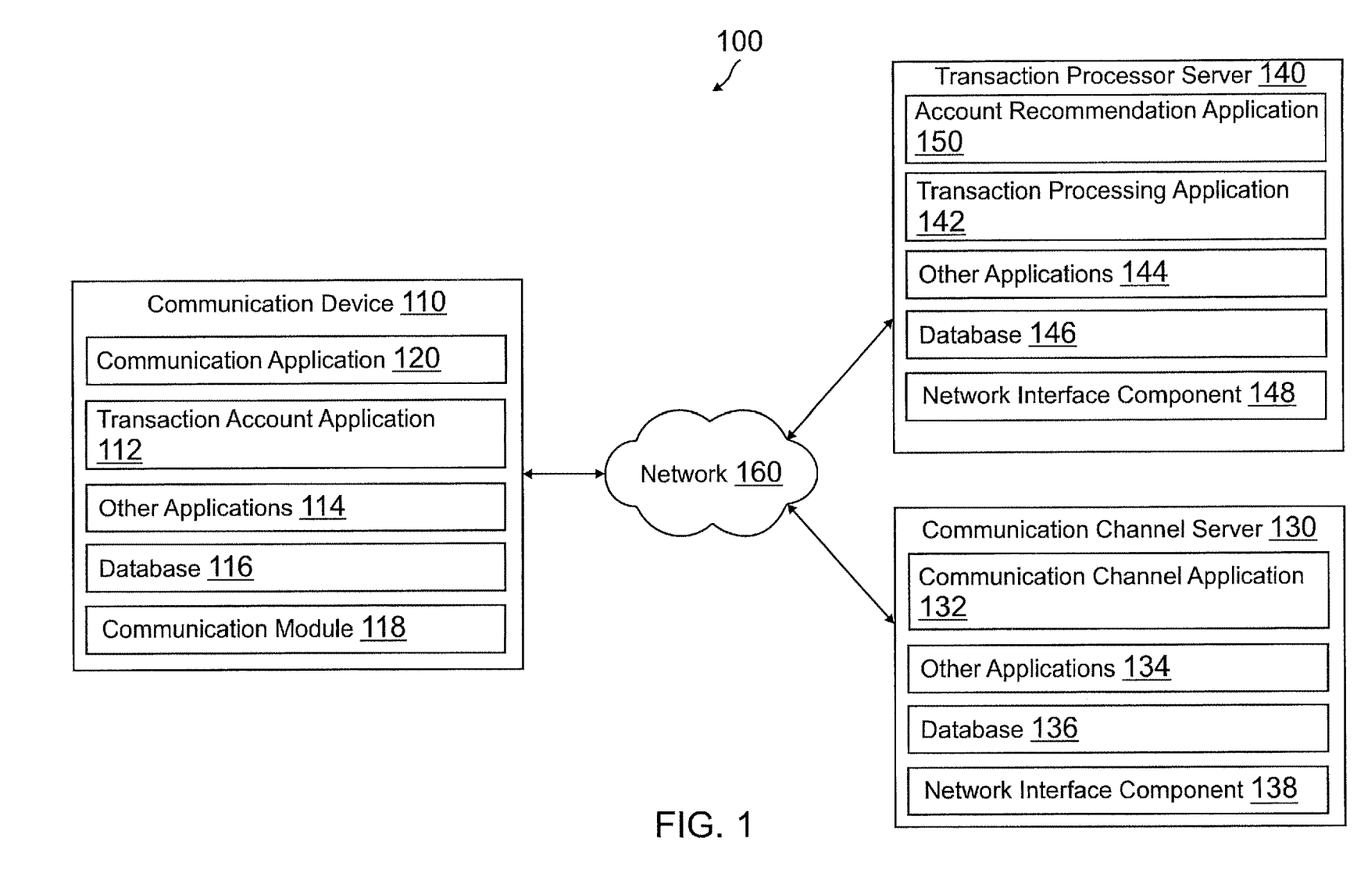
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a communication channel server 130, and a transaction processor server 140 in communication over a network 160. The user (not shown) may utilize communication device 110 to utilize the various features available for communication device 110, which may include processes and/or applications associated with account usage for transaction processing by the user. For example, transaction processor server 140 may correspond to a service provider that provides one or more accounts the user, which may be utilized through communication device 110. The accounts may allow the user to utilize one or more features or services provided by the account and/or transaction processor server 140, such as transaction processing services to process a transaction between the user and another entity and provide a payment to such an entity. Transaction processor server 140 may determine an account action to take for the user's account, such as a recommendation of a feature, and communicate the recommendation to the user through communication channel server 130. Thus, communication channel server 130 may provide one or more accessible electronic communication channels for transmission of the recommendation to the user through communication device 110.

Communication device 110, communication channel server 130, and transaction processor server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Communication device 110 may be implemented as a communication device that may utilize appropriate hardware and software configured for wired and/or wireless communication with communication channel server 130, and/or transaction processor server 140. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 110 of FIG. 1 contains a communication application 120, a transaction account application 112, other applications 114, a database 116, and a communication module 118. Communication application 120, transaction account application 112, and other applications 114 may correspond to executable processes, procedures, and/or applications with associated hardware. In other embodiments, communication device 110 may include additional or different modules having specialized hardware and/or software as required.

Communication application 120 may correspond to one or more processes to execute software modules and associated devices of communication device 110 to engage in communications with one or more other entities, including users, merchants, and/or transaction processor server 140 through one or more electronic communication pathways, mechanisms, or channels provided by communication channel server 130. In this regard, communication application 120 may correspond to specialized hardware and/or software utilized by a user of communication device 110 to access a communication channel, which may correspond to direct communications between one or more users or more indirect communication mediums. For example, communication application 120 may correspond to email, direct or instant messaging, private messaging, voice messaging including voice over IP or LTE (VoIP or VoLTE), text messaging, or other communication service where communications are directly between parties involved in the transmission of messages. However, in other embodiments, communication application 120 may correspond to less direct communications between parties, such as social networking, microblogging, media sharing, online forum posting, and/or other communication channels that may connect multiple users in an indirect way that does not require their active participation in communications between parties. Additionally, communication application 120 may also be utilized to access one or more websites, or may correspond to a browser application. In such embodiments, communications may be directed just to the user of user device 110 through website and/or application communications, such as alerts, banners, advertisements (e.g., embedded, pop-up, or other type of displayable advertisement). In this regard, communication application 120 may be used to receive a communication from communication channel server 130, where the communication may include an account action taken by transaction processor server 140, such as a recommendation, advertisement, and/or alert, as discussed herein.

Transaction account application 112 may correspond to one or more processes to execute software modules and associated devices of communication device 110 to enter one or more establish an account for a user with transaction processor server 140, as well as enter payment instruments or other funding sources for storage in a digital wallet associated with the account (e.g., stored and/or serviced by transaction processor server 140) and engage in transaction processing using the services of transaction processor server 140. In this regard, transaction account application 112 may correspond to specialized hardware and/or software utilized by a user of communication device 110 that initially provides an interface to permit the user to enter input to establish an account, such as personal information, and other data including payment instruments or financial information, for example, through an input device (e.g., touch screen with a graphical user interface, keypad/keyboard, mouse, etc.) and/or through a data capture device (e.g., scanner, camera, other optical device, etc.) The information may include authentication credentials, as well as other account access and/or user authentication information. The information may be utilized by transaction processor server 140 to establish the account, as discussed herein. Such information may be stored with transaction processor server 140 for use with an online digital wallet stored to an account for the user with transaction processor server 140, which may be utilized for transaction processing with another entity, such as a merchant associated with communication channel server 130. In various embodiments, information for the account may also be stored to communication device 110 for use in an offline environment. The account accessible through transaction account application 112 may be used to initiate, receive, and/or process/complete transactions using services provided by transaction processor server 140. Once entered, the payment instruments may be communicated to transaction processor server 140 over network 160 by transaction account application 112 for establishment and/or maintenance/update of the account and/or entry into the digital wallet for the user. The user of communication device 110 may also enter discounts and/or benefits to transaction account application 112 for storage to the digital wallet and use during transaction processing.

Transaction account application 112 may utilize one or more user interfaces, such as graphical user interfaces presented using an output display device of communication device 110, to enable the user associated with communication device 110 to utilize the account, including utilizing the account to perform transaction processing using transaction processor server 140. Thus, transaction account application 112 may be utilize to select and/or utilize one or more of the features provided by transaction processor server 140. The features may be added by the user or selected by the user for utilization. Additionally, the features may be added, used, and/or adopted by the user based on a communication of an account action transmitted to the user through communication application 120 and/or transaction account application 112. For example, in various embodiments, transaction account application 112 may correspond to a general browser application configured to retrieve, present, and communicate information over the Internet (e.g., utilize resources on the World Wide Web) or a private network. For example, transaction account application 112 may provide a web browser, which may send and receive information over network 160, including retrieving website information (e.g., a website for transaction processor server 140), presenting the website information to the user, and/or communicating information to the website. However, in other embodiments, transaction account application 112 may include a dedicated application of transaction processor server 140 or other entity (e.g., a merchant), which may be configured to assist in processing transactions. The interface(s) providing by transaction account application 112 may be utilized to enter transaction information, receive transaction information from communication channel server 130, and/or initiate a process to communicate the preauthorized token to communication channel server 130. Additionally, transaction account application 112 may be used to receive an account action from transaction processor server 140 and display the account action, such as through a checkout page notification, statement notification, banner within a webpage/dedicated application of transaction processor server 140, or other location.

Transaction account application 112 may be utilized to select payment instrument(s) for use in providing payment for a purchase transaction, transfer, or other financial process. As discussed herein, transaction account application 112 may utilize user financial information, such as a credit card, bank account, or other financial account, as a payment instrument when providing payment information. Additionally, transaction account application 112 may utilize a digital wallet stored to an account with a payment provider, such as transaction processor server 140, as the payment instrument, for example, through providing a token that identifies the account and authenticates the user for use of the account. Thus, transaction account application 112 may provide the token to authenticate the user and/or use the user's payment account, digital wallet, and/or payment instruments. Transaction account application 112 may use such a token during transaction processing to authenticate the user and complete transaction processing by providing the token, which may be encrypted and/or provided through a secure channel, to communication channel server 130 to authenticate the user and/or the user's payment account, digital wallet, and/or payment instruments to transaction processor server 140 and allow for transaction processing and payment using the user's payment account, digital wallet, and/or payment instruments. Transaction account application 112 may be utilized to view the results of payment, for example, using transaction histories, dispute resolution processes, and other post-transaction process.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications may include social networking applications, media viewing, and/or merchant applications. Other applications 114 may include device interface applications and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices, including speakers.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with transaction account application 112 and/or other applications 114, identifiers associated with hardware of communication device 110, or other appropriate identifiers, such as identifiers used for payment/user/device authentication or identification, which may be communicated as identifying communication device 110 to transaction processor server 140. In various embodiments, account information and/or digital wallet information may be stored to database 116 for use by communication device 110. For example, receive account actions, such as notifications, recommendations, and/or alerts may be stored to database 116.

Communication device 110 includes at least one communication module 118 adapted to communicate with communication channel server 130 and/or transaction processor server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices (e.g., communication channel server 130) using short range communications, such as Bluetooth Low Energy, LTE Direct, WiFi, radio frequency, infrared, Bluetooth, and near field communications.

Communication channel server 130 may be implemented using any appropriate hardware and software configured for wired and/or wireless communication with communication device 110 and/or transaction processor server 140. Thus, communication channel server 130 may correspond to a server of an entity that may provide direct communication services to the user associated with communication device 110, including telecommunication services, text messaging services, email, instant or direct messaging service, VoIP or VoLTE services, and/or other messaging service directly between two or more services. However, in other embodiments, communication channel server 130 may correspond to a social network, media sharing platform, microblogging platform, online posting forum, or other online resource including websites to communicate information to a user. Although a server is shown, the server may be managed or controlled by any suitable processing device. Although only a single service provider is shown, a plurality of service providers may function similarly.

Communication channel server 130 of FIG. 1 contains a communication channel application 132, other applications 134, a database 136, and a network interface component 138. Communication channel application 132 and other applications 134 may correspond to processes, procedures, and/or applications executable by a hardware processor, for example, a software program. In other embodiments, communication channel server 130 may include additional or different modules having specialized hardware and/or software as required.

Communication channel application 132 may correspond to one or more processes to execute software modules and associated specialized hardware of communication channel server 130 to provide a channel, mechanism, or platform to communicate a message to a user, including account actions taken by transaction processor server 140 with respect to an account for the user associated with communication device 110. In this regard, communication channel application 132 may correspond to specialized hardware and/or software of communication channel server 130 to provide such an electronic communication channel where the user associated with communication device 110 may view information transmitted to the user from transaction processor server 140. The information may correspond to an account action, such as a notification, advertisement, alert, or other type of message, as discussed herein. In order to transmit the information to communication device 110 for display to the user, communication channel application 132 may provide a direct communication channel or an indirect communication channel. For example, communication channel server 130 may provide email, direct or instant messaging, private messaging, voice messaging including voice over IP or LTE (VoIP or VoLTE), text messaging, or other direct communication service. However, in other embodiments, communication channel server 130 may correspond to social networking, microblogging, media sharing, online forum posting, and/or other indirect communication channels. Communication channel application 132 may receive data from transaction processor server 140, such as information for an account action taken by transaction processor server 140 after analysis of the user and/or account. Communication device 110 may then access the communication channel provided by communication channel application 132 and receive the data from transaction processor server 140.

Communication channel server 130 includes other applications 134 as may be desired in particular embodiments to provide features to communication channel server 130. For example, other applications 134 may include security applications for implementing server-side security features, programmatic client applications for interfacing with appropriate application programming interfaces (APIs) over network 160, or other types of applications. Other applications 134 may contain software programs, executable by a processor, including a graphical user interface (GUI) configured to provide an interface to the user. Other application 124 may further provide security applications and/or authentication applications and processes.

Communication channel server 130 may further include database 136 which may include, for example, identifiers such as operating system registry entries, cookies associated with communication channel application 132 and/or other applications 134, identifiers associated with hardware of communication channel server 130, or other appropriate identifiers, such as identifiers used for payment/user/device authentication or identification. Identifiers in database 136 may be used by a payment/credit provider, such as transaction processor server 140, to associate communication channel server 130 with a particular account maintained by the payment/credit provider. Database 136 may further include received data from transaction processor server 140 that may be provided to communication device 110 through communication channel application 132.

Communication channel server 130 includes at least one network interface component 138 adapted to communicate with communication device 110 and/or transaction processor server 140. In various embodiments, network interface component 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor server 140 may be maintained, for example, by an online service provider, which may provide transaction processing and payment services. Additionally, transaction processor server 140 may provide such services through one or more account, where transaction processor server 140 may further provide account maintenance and lifecycle updates through account actions taken for a user's account. In this regard, transaction processor server 140 includes one or more processing applications which may be configured to interact with communication device 110, communication channel server 130, and/or another device/server to facilitate the aforementioned processes. In one example, transaction processor server 140 may be provided by PAYPAL®, Inc. of San Jose, Calif., USA. However, in other embodiments, transaction processor server 140 may be maintained by or include another type of service provider, which may provide connection services to a plurality of users.

Transaction processor server 140 of FIG. 1 includes an account recommendation application 150, a transaction processing application 142, other applications 144, a database 146, and a network interface component 148. Transaction processing application 142 and other applications 144 may correspond to executable processes, procedures, and/or applications with associated hardware. In other embodiments, transaction processor server 140 may include additional or different modules having specialized hardware and/or software as required.

Account recommendation application 150 may correspond to one or more processes to execute software modules and associated specialized hardware of transaction processor server 140 to access account information for a user's online account with transaction processor server 140, determine a user model and/or account lifecycle status for the account, determine an account action to take based on the user model and/or account lifecycle status, and communicate the account action through a communication channel selected particularly for the user based on the effectiveness and/or visibility of the communication channel. In this regard, account recommendation application 150 may correspond to specialized hardware and/or software to access account information for an account of the user associated with communication device 110. The information may be accessed based on a timing in the account lifecycle, such as if the user has just signed up for the account, after the user utilizes the account, and/or if the account has not been used after a predetermined amount of time. Thus, accessing the account information may be performed based on the lifecycle status of the account, such as a new account, an in-use account, and/or closing or a not-used account, such as one that may become part of transaction processor server 140's churn rate. The account information may include account usage information, such as amount of usage, type of usage, and/or features used by the user with the account, as well as user information for the user. Using the account information, a user model for the user may be generated, where the user model may indicate potential features of interest to the user based on the user behavior, interests, and/or online actions. Additionally, the account information may indicate the lifecycle status of the account, such as the length of use (e.g., age of the account), amount of use, and/or features used by the account.

Account recommendation application 150 may utilize the user model and/or the account lifecycle status to determine an account action to take with respect to the account for the user associated with communication device 110. For example, the user model may be utilized to determine a potential feature that the user may be interested in based on the user's historical data and usage. The user model may also be compared to other user models to determine a peer group for the user, where other features used by the peer group but not the user may be of potential interest to the user. Similarly, the account lifecycle data may also be used to determine a feature of potential interest to the user or other information that may assist the user or retain the user as a customer. For example, the lifecycle data may indicate that the user is new, where the user may be interested in the most commonly used features and prefer information on such features. However, if the user is a savvy user, the feature may correspond to an uncommon feature specific to the user's model, or a user likely to leave or close their account may be associated with a feature that incentivizes the user to further use the account. The lifecycle status may also be compared to other users at a same or similar lifecycle point or having the same or similar lifecycle status to select a feature that was of interest to the other users. In other embodiments, account actions other than introduction of the user to features may be determined by account recommendation application 150. For example, the account action may correspond to conveying a change in features, terms of service, and/or fees may be determined, which may be of interest to the user based on the user model and/or account lifecycle status. In other embodiments, the account action may correspond to a change in account status or level based on the user model and/or lifecycle status, or other action that may be performed with the user's account. Moreover, account recommendation application 150 may periodically or continuously (e.g., in real-time) update the user model and/or account lifecycle data based on changing account information, such as new user information and/or account usage, where account actions may be changed or determined based on the updated user model and/or account lifecycle data.

Once the account action is determined, account recommendation application 150 may determine a communication channel for transmission of the account action to the user. The communication channel may correspond to an online service or other electronic communication pathway for transmission of data to a user. In this regard, the electronic communication channel may correspond to a direct communication channel, for example, using email, direct or instant messaging, private messaging, voice messaging including voice over IP or LTE (VoIP or VoLTE), text messaging, or other direct communication service, or may correspond to website/application interface displays, online advertisement, social networking, microblogging, media sharing, online forum posting, and/or other indirect communication channels. Thus, the electronic communication channel may utilize transaction account application 112, for example, through notifications and/or information provided on a checkout page, website banner, account interface, and/or viewable statement, or may correspond to a service provided by communication channel server 130. Thus, account recommendation application 150 may communicate the account action through the communication channel using one or more of an email, message, online advertisement, website banner, interface graphic or display, social networking feed, microblogging post, posted media advertisement, embedded or displayable information in an external website or application, or other notification, message, or alert for the user that may be conveyed through the selected electronic communication channel.

Account recommendation application 150 may determine the electronic communication channel to transmit the account notification based on likely the user associated with communication device 110 will view the account action and/or respond to the account action. For example, account recommendation application 150 may determine a visibility measurement or rating based on used communication channels by the user, as well as a measurement of the user's response rate, such as opening a message, viewing the message for a substantial amount of time to consume the information in the message, click-through rate, and/or adoption of the advertised feature in the message. Account recommendation application 150 may select an electronic communication based on the visibility and/or response rate for the user. Additionally, account recommendation application 150 may monitor times of use of the communication channels to select the communication channel and a time to transmit the account action to the user. For example, the user may utilize the selected communication channel between a defined time period and/or for a specific amount of time. Thus, account recommendation application 150 may transmit the account action to the user along the communication channel just prior to (e.g., 5 minutes before) the user utilizing the communication channel and/or while the user utilizes the communication channel. In various embodiments, the user model and/or lifecycle status may be used to select a communication channel that was effective for peer users similar to the user. Thus, the electronic communication channel may be selected through comparison of the user to other users and finding the most effective communication channel, as well as time for communication on the channel, based on the behavior of the other users. Moreover, account recommendation application 150 may continue to monitor the user's viewing of and/or response to the account actions provided to the user, as well as the used communication channels and times of use, for the user to update and select the most visible and/or reacted to communication channel for the user in the future with future account actions.

Transaction processing application 142 may correspond to one or more processes to execute software modules and associated specialized hardware of transaction processor server 140 to provide payment services to merchants and users, for example though an account and/or payment instruments of the user and/or merchant stored in a digital wallet of the account. In this regard, transaction processing application 142 may correspond to specialized hardware and/or software to establish one or more accounts, including digital wallets storing payment instruments, which may be serviced by account recommendation application 150 to provide the user with additional account information and/or features of relevance to the user. Thus, transaction processing application 142 may provide one or more account features and/or services to the user associated with communication device 110 through the account established by the user. The user may select one or more of the features or services for use, inclusion in the account, and/or purchase. Additional features or services may further be added to the account through one or more account actions taken by account recommendation application 150, as discussed herein. The features and/or services may allow for a payment to a merchant or user by a user through a payment instrument, including a credit/debit card, banking account, payment account with transaction processor server 140, and/or other financial instrument. In order to establish an account for a merchant and/or user to send and receive payments, transaction processing application 142 may receive information requesting establishment of the payment account. The information may include user personal, business, and/or financial information. Additionally the information may include a login, account name, password, PIN, or other account creation information. The user may provide a name, address, social security number, or other personal or business information necessary to establish the account and/or effectuate payments through the account. Transaction processing application 142 may further allow the merchant/user to service and maintain the payment account, for example, by adding and removing payment instruments.

Transaction processing application 142 may be used to provide a payment for a transaction to a merchant, for example, between communication device 110 and communication channel server 130. The payment for a transaction may be effectuated through a token received by transaction processing application 142. For example, when communication device 110 wishes to provide payment for a transaction, communication device 110 may provide the token to another device. Transaction processing application 142 may receive the token from the device and utilize data in the token to debit an account of the user and provide the payment to an account of the merchant. Transaction processing application 142 may also be used to provide transaction histories for processed transactions.

In various embodiments, transaction processor server 140 includes other applications 144 as may be desired in particular embodiments to provide features to transaction processor server 140. For example, other applications 144 may include security applications for implementing server-side security features, programmatic client applications for interfacing with appropriate application programming interfaces (APIs) over network 160, or other types of applications. Other applications 144 may contain software programs, executable by a processor, including a graphical user interface (GUI), configured to provide an interface to the user when accessing transaction processor server 140, where the user or other users may interact with the GUI to more easily view and communicate information. In various embodiments, other applications 144 may include connection and/or communication applications, which may be utilized to communicate information to over network 160.

Additionally, transaction processor server 140 includes database 146. As previously discussed, the user and/or the merchant may establish one or more digital wallets and/or accounts with transaction processor server 140. Digital wallets and/or accounts in database 146 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to transaction processor server 140, e.g., from communication device 110, one or more digital wallets and/or payment accounts belonging to the users may be found. Database 146 may also store the user preferences for an account for the user and/or merchant. Database 146 may also store account information, including account usage and user information, as well as user models and/or account lifecycle status determined using the account information.

In various embodiments, transaction processor server 140 includes at least one network interface component 148 adapted to communicate communication device 110 and/or communication channel server 130 over network 160. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2A:
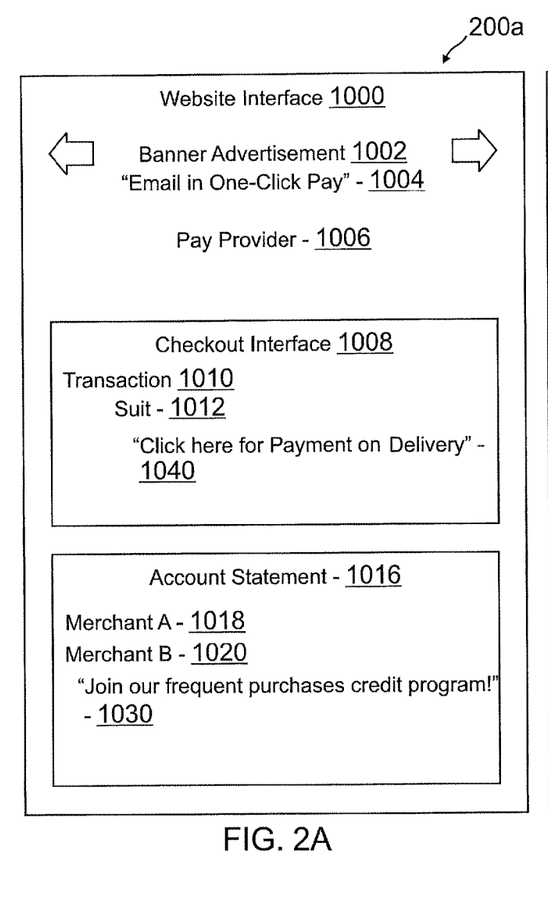
FIG. 2A is an exemplary interface of service provider website providing targeted account actions and recommendations based on intelligent online account lifecycle maintenance through automated event monitoring, according to an embodiment.

FIG. 2A is an exemplary interface of service provider website providing targeted account actions and recommendations based on intelligent online account lifecycle maintenance through automated event monitoring, according to an embodiment. Environment 200a of FIG. 2A includes a website interface 1000 displayed on a communication device corresponding generally to the described features, processes, and components of communication device 110 in environment 100 of FIG. 1. In this regard, a user utilizing the communication device to view website interface 1000 may view one or more messages, notifications, alerts, or other type of communication related to an account action taken by a service provider with respect to the user's account based on the account information for the account.

Thus, website interface 1000 displays one or more interface elements showing an electronic communication channel or pathway to display the account action to the user. The account action may be determined based on a user model for the user and/or based on an account lifecycle status, such as a point in an account lifecycle, for the account. Such account action may correspond to a notification or advertisement for a feature provided by the service provider which may be of interest to the user. For example, website interface 1000 includes a banner advertisement 1002 include a banner message 1004 that includes text "Enroll in One-Click Pay." Thus, banner message 1004 may correspond to an advertisement for a "One-Click" feature provided by a service provider.

Website interface 1000 may further include additional information for Pay Provider 1006, include checkout interface 1008 and account statement 1016. Checkout interface 1008 and account statement 1016 may further be used as a communication channel to transmit an account action to a user. For example, checkout interface 1008 displays information for a transaction 1010, such as a purchase of a suit 1012. In checkout interface 1008, a recommendation may be provided to the user for use with transaction 1010, such as checkout message 1040 for "Click here for payment on delivery!" Similarly, account statement 1016 may include a statement of purchases and/or transactions, such as a transaction with a merchant A 1018 and a merchant B 1020. Account statement 1016 further includes statement message 1030 for "Join our frequent purchaser's credit program!" Thus, checkout interface 1008 and account statement 1016 may also be used as communication channels to transmit an account action.

While website interface 1000 in environment 200a includes multiple different account actions or notifications through a plurality of communication channels, it is understood that FIG. 2A is exemplary, and a single or multiple account action or notifications may be determined, which may be transmitted through a single or multiple communication channels. For example, instead of all three of banner message 1004, checkout message 1014, and statement message 1030, one of banner advertisement 1002, checkout message 1014, or statement message 1030 may be selected based on the user model and/or account lifecycle status based on a feature that the user is most likely to adopt and through the most visible communication channel for the user.

Figure 2B:
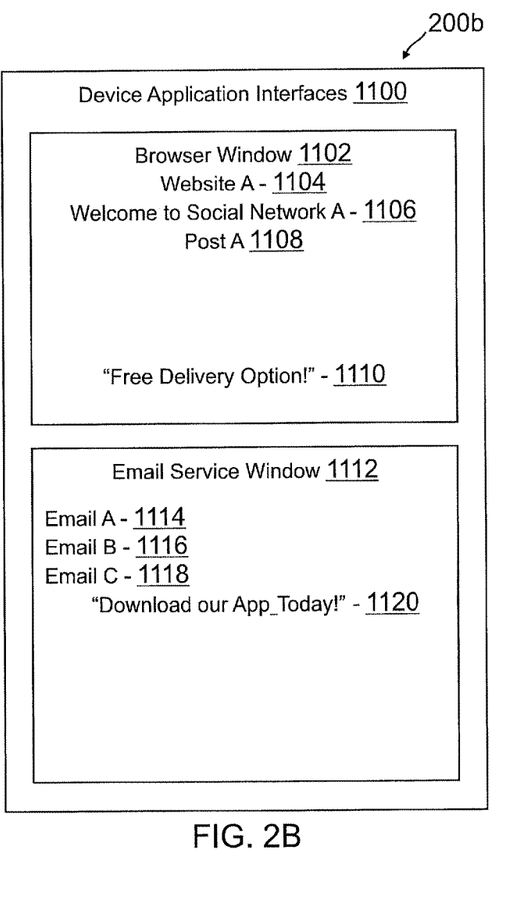
FIG. 2B is an exemplary interface of a communication device having multiple application windows displaying targeted account actions and recommendations based on intelligent online account lifecycle maintenance through automated event monitoring, according to an embodiment.

FIG. 2B is an exemplary interface of a communication device having multiple application windows displaying targeted account actions and recommendations based on intelligent online account lifecycle maintenance through automated event monitoring, according to an embodiment. Environment 200b of FIG. 2B includes device application interfaces 1100 displayed on a communication device corresponding generally to the described features, processes, and components of communication device 110 in environment 100 of FIG. 1. In this regard, a user utilizing the communication device to view device application interfaces 1100 may view one or more messages, notifications, alerts, or other type of communication related to an account action taken by a service provider with respect to the user's account based on the account information for the account.

For example, a browser window 1102 may be utilized to browse the Internet and access one or more websites. The accessed website may correspond to the service provider that wishes to communicate an account action to the user, or may correspond to an external website unrelated to the service provider. For example, website A 1104 corresponds to a social networking service, where a greeting 1106 welcomes the user to the social network and provides the user with social networking services, such as online posting, receiving a feed of social posts and/or events, and/or messaging. In this regard, a post A 1108 may be viewed by the user. Additionally, a social network post 1110 that correspond to the account action from the service provider may inform the user of a "Free Delivery Option!" and allow the user to add the option to the user's account. Similarly, an email service window 1112 may be used to view emails of the user, such as an email A 1114 and an email B 1116. Additionally, the service provider may communicate the account action to the user through an email, such as an email C 1118 with content 1120 displaying "Download our App Today!"

Similar to FIG. 2A, while device application interfaces 1100 in environment 200b includes multiple different account actions or notifications through a plurality of communication channels, it is understood that FIG. 2B is exemplary, and a single or multiple account action or notifications may be determined, which may be transmitted through a single or multiple communication channels.

Figure 3:
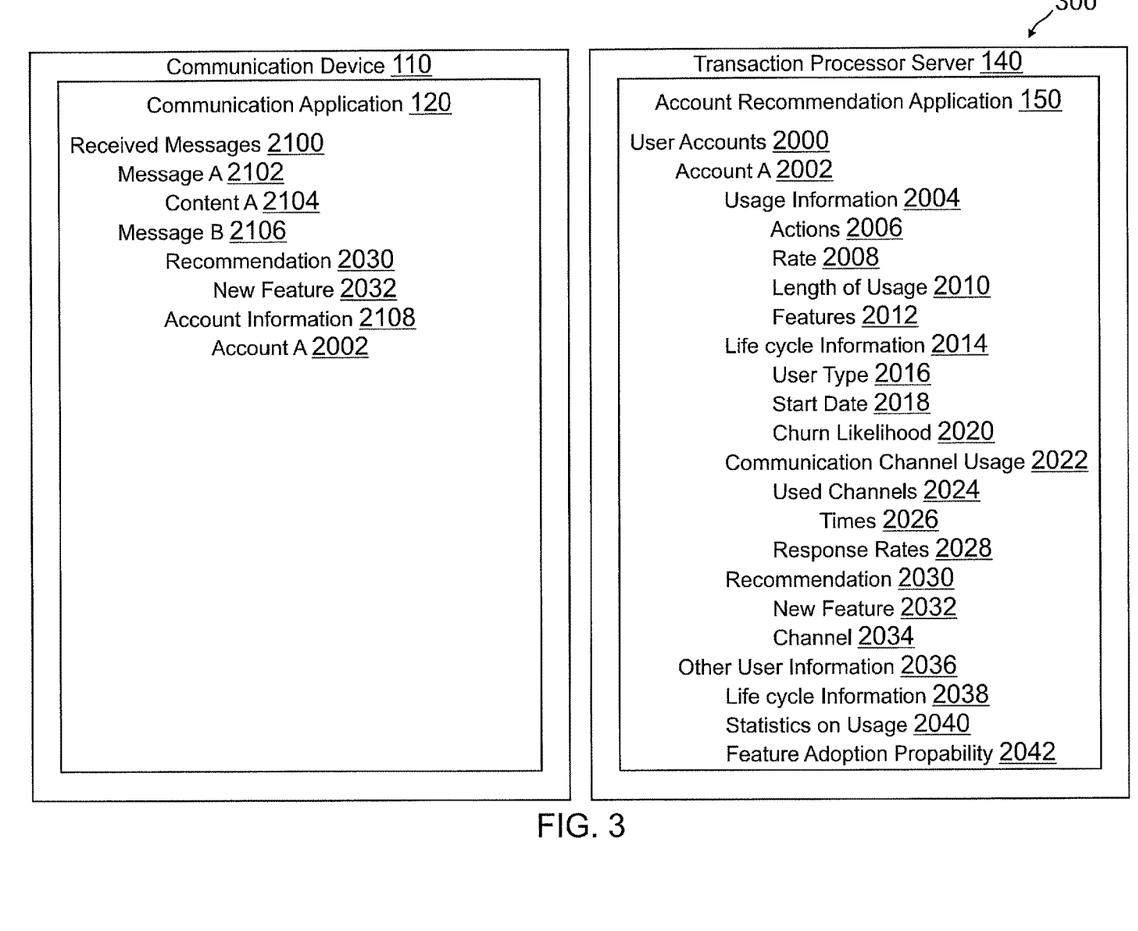
FIG. 3 is an exemplary system environment showing a communication device and a transaction processing server interacting to provide account actions and recommendations based on intelligent online account lifecycle maintenance through automated event monitoring, according to an embodiment.

FIG. 3 is an exemplary system environment showing a communication device and a transaction processing server interacting to provide account actions and recommendations based on intelligent online account lifecycle maintenance through automated event monitoring, according to an embodiment. FIG. 3 includes communication device 110 and transaction processor server 140 corresponding generally to communication device 110 and transaction processor server 140 discussed in reference to environment 100 of FIG. 1.

Transaction processor server 140 includes account recommendation application 150 corresponding generally to the processes and features discussed in reference to account recommendation application 150 in environment 100 of FIG. 1. In this regard, account recommendation application 150 may include information used to determine an account action for an account of a user based off account information. For example, account recommendation application 150 includes user accounts 2000, which may include data for an account A 2002 for a user. Account A 2002 may be associated with account data that corresponds to the usage, actions, and/or stored information for the account, such as usage information 2004, lifecycle information 2014, and a communication channel usage 2022. Usage information 2004 may include data for actions 2006 for account A 2002, a rate 2008 of usage for account A 2002, a length of usage 2010 for account A 2002, and/or features 2012 used by account A 2002. Similarly, lifecycle information may include additional information associated with usage of account A 2002, such as a user type 2016 for the user of account A 2002, a start date 2018 for account A 2002, and/or a churn likelihood 2020 associated with a churn rate for account A 2002. Account recommendation application 150 may further utilize communication channel usage 2022 to determine a communication channel to transmit an account action, such as a recommendation 2030. Thus, communication channel usage 2022 may include used channels 2024 including times 2026 for used channels 2024, and response rates 2028 to messages received through one or more communication channels.

Thus, the aforementioned information may be used to determine recommendation 2030 for account A 2002. Recommendation 2030 may include a new feature 2032 for the user of account A 2002 that the user may add to features 2012 of account A 2002 based on the user model and/or lifecycle status of the user and/or account A 2002. Additionally, recommendation 2030 may be determined with channel 2034 for communication of recommendation 2030 to the user. Recommendation 2030 may be determined using other user information 2036, which may include statistics and/or analysis of trends of peer users and/or account for the user of account A 2002 and/or account A 2002. Thus, other user information 2036 includes lifecycle information 2038, statistics on usage 2040, and feature adoption probability 2042, which may be used to find peer users for account A 2002 and generate recommendation 2030.

Communication device 110 includes communication application 120 corresponding generally to the processes and features discussed in reference to transaction account application 112 in environment 100 of FIG. 1. In this regard, communication application 120 may include a received account action, such as recommendation 2030 from transaction processor server 140. Thus, communication application 120 includes received messages 2100. Received messages 2100 may be received through an electronic communication pathway, channel, or mechanism determined by transaction processor server 140, such as channel 2034 for recommendation 2030. Thus, received messages 2100 includes a message A 2102 having content A 2104, such as another email or message in an account of the user. Further, received messages 2100 includes recommendation 2030 from transaction processor server 140, which includes new feature 2032 advertised for use with account A 2002. Additionally, message B 2106 may include account information 2108 for account A 2002 that may inform the user of current features and/or information necessary to adopt or add new feature 2032.

Figure 4:
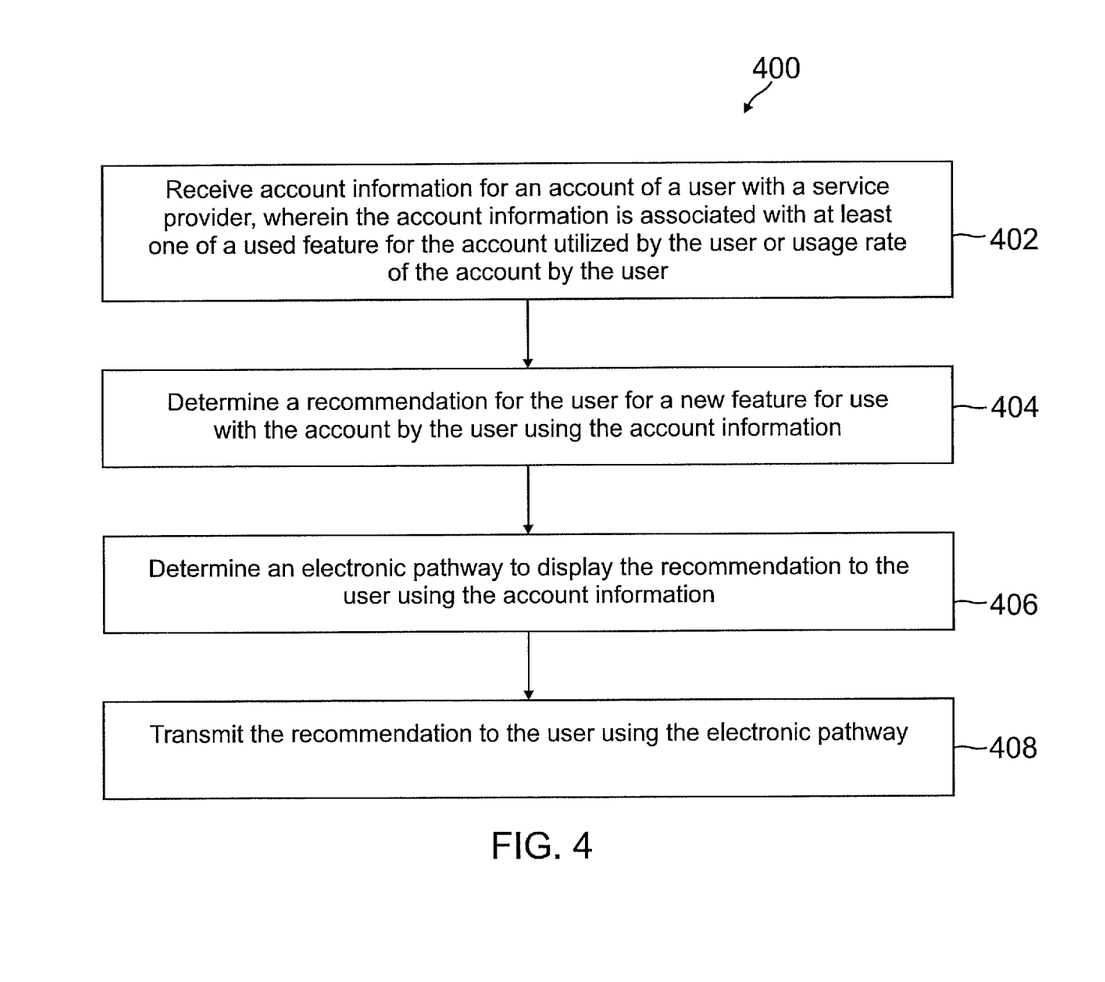
FIG. 4 is a flowchart of an exemplary process for intelligent online account lifecycle maintenance through automated event monitoring, according to an embodiment.

FIG. 4 is a flowchart of an exemplary process for intelligent online account lifecycle maintenance through automated event monitoring, according to an embodiment. Note that one or more steps, processes, and methods described herein may be omitted, performed in a different sequence, or combined as desired or appropriate.

At step 402, account information for an account of a user with a service provider is retrieved, wherein the account information is associated with at least one of a used feature for the account utilized by the user or usage rate of the account by the user. The account information may include account usage information such as user information for the user, where the user information comprises at least one of, user actions taken by the user using the online account, demographics of the user, past opt-ins by the user in features provided by the service provider system for the account, currently used features by the user using the online account, or amount or rate of usage of the online account by the user, and where the account feature is determined using the user information. Additionally, the account feature for the advertisement may comprise one of a renewal of the online account, an upgrade for the online account, a discount for the online account, a free return policy for the online account, a payment required after delivery for purchases made using the online account, an extendable credit for the use by the user with the online account, a mobile application download to access the service provider system or the online account, or a persistence based login option for the online account with a web browser or merchant marketplace application.

In various embodiments, a first user state for the user may be determined, such as a user model and/or an account lifecycle status for an account of the user. The state for the user may comprise one of a high account usage rate (e.g., exceeding a predetermined number of uses within a calendar year) by the user, a low account usage rate by the user (e.g., where the user uses the account sparingly, which may be determined as falling beneath a threshold number of uses for a time period, such as less than once a day, week, month, etc.), a longtime user status for the user (e.g., a user of the service provider for over a certain length of time to qualify as a longtime user, such as longer than the average lifespan of all accounts of the service provider or longer than a threshold period, such as a year), a short time user status for the user (e.g., less than the threshold time period previously discussed, such as less than the average account lifespan and/or under a threshold time period, such as a year), account lifecycle status data for the online account, or an opt-in rate for account features by the user compared to other users of the service provider system. Additionally, accessing the account information may comprise determining when to provide the first account action to the user based on the account usage information. The determining when to provide the first account action to the user may be based on a parameter comprising one of a likelihood rating to accept or adopt the first account action, a likelihood rating of loss of the user as a customer (which may be determined using past user action and/or inaction, for example, where a user does not use an account for a year and is determined to be a lost user as 95% of all other users that do not use their account do not return), a likelihood rating of closure of the online account by the user, or a lifecycle status for the account.

At step 404, a recommendation or account action for the user for a new feature for use with the account by the user is determined using the account information. For example, the recommendation or account action may comprise an advertisement for an account feature for use with the online account based on the degree of usage of the online account. In various embodiments, a probability of adoption of the account feature by the user is determined using the first state of the user, and the account feature for the advertisement is determined based on the probability of adoption. For example, the recommendation may comprise a feature for the account based on a probability of adoption of the feature for the user, where probability of adoption is based on statistical analysis of past user adoption rates of the feature by a plurality of other users sharing a set of common traits with the user of the service provider.

An electronic pathway to display the recommendation to the user is determined using the account information, at step 406. In various embodiments, determining the electronic pathway may comprise determining a time to convey the first account action to the user, wherein transmitting the first account action to the user through the electronic communication process occurs at the determined time. The electronic pathway may be determined based on a (highest) likelihood rating that the user will view the first account action, wherein the likelihood rating is based on a statistical rate of viewing of each of a plurality of electronic communication mechanism. Additionally, the account information may comprise user specific viewing patterns for the user, wherein the electronic pathway is determined based on the user specific viewing patterns. The user specific viewing patterns may comprise at least one of a time of viewing each of a plurality of media sources, a length of viewing the each of the plurality of media sources, responses to advertisements from the each of the plurality of media sources, or user information integration with the each of the plurality of media sources. The electronic pathway may comprise a webpage banner or advertisement for a webpage accessed by the user of the service provider, a checkout interface for a checkout process of the service provider used by the user, an email transmitted to the user, a dedicated application of the service provider used by the user, an online resource accessed by the user, or a messaging service used by the user.

At step 408, the recommendation is transmitted to the user using the electronic pathway. In various embodiments, one of an acceptance or a cancelation of the first account action may be received, a second state for the user may be determined based on the account usage information and the one of the acceptance or the cancelation and a second account action to take with the online account may be determined using the second state. Thus, the second account action may be communicated to the user using the electronic communication mechanism. Additionally, prior to determining the recommendation or account action, a lifecycle point in account usage of the account by the user may be determined using the account information, wherein the account information comprises lifecycle data for a lifecycle of the account. Thus, the account action or recommendation may be further determined based on the lifecycle point in account usage. The lifecycle point in account usage may comprise an end of account usage, wherein the recommendation comprises an incentive for use of the account by the user.

Figure 5:
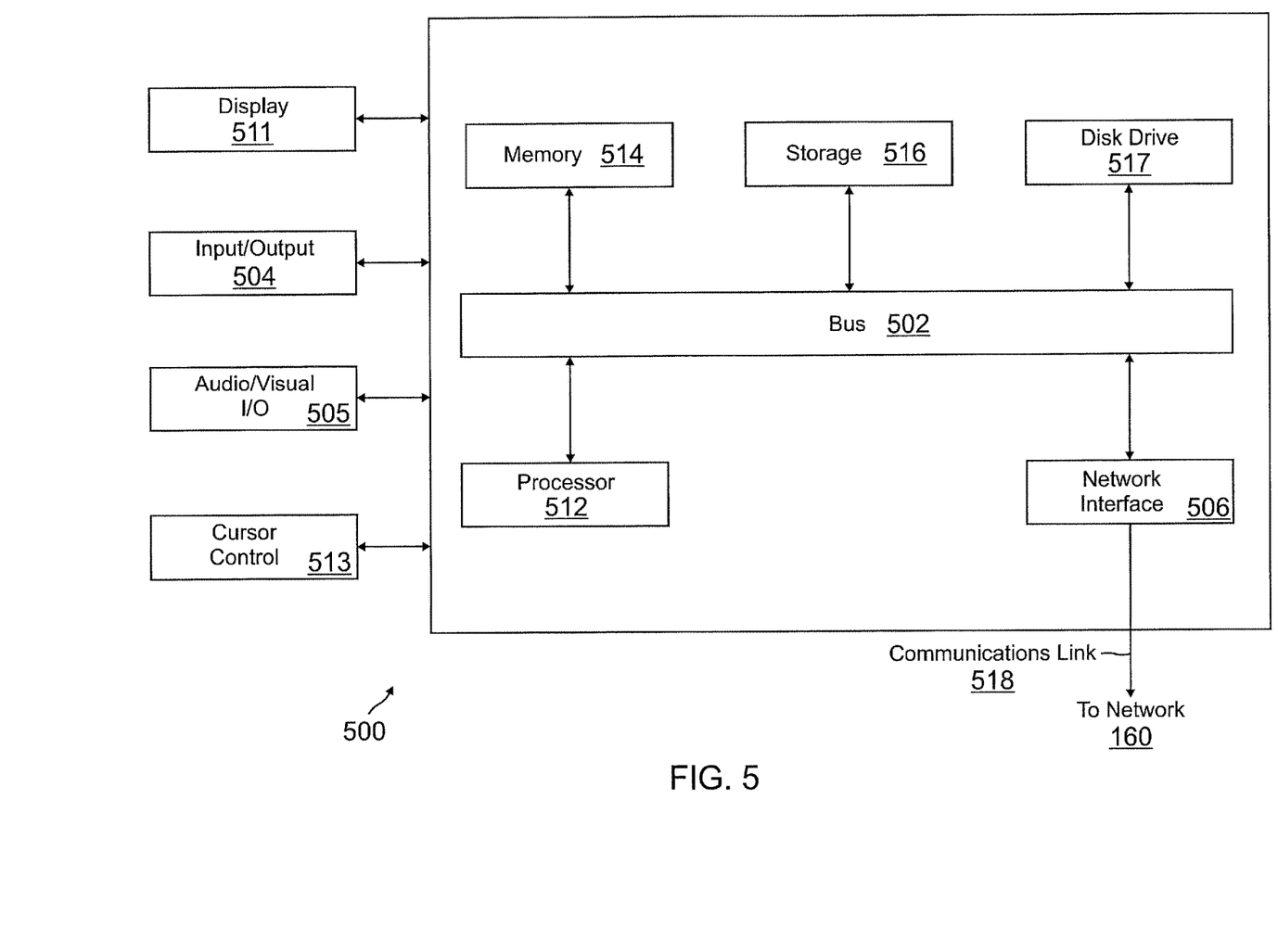
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A service provider system comprising:
   a non-transitory memory; and
   one or more hardware processors coupled to the non-transitory memory and configured to read instructions from the non-transitory memory to cause the service provider system to perform operations comprising:
   accessing account usage information for an online account of a user with the service provider system, wherein the online account is accessible through an application on a device of the user;
   determining a first state of the user using the account usage information, wherein the first state of the user is associated with at least a degree of usage by the user of the online account;
   determining, based on the first state of the user and states of a plurality of other users, a user model associated with the user of the online account;
   determining that the user model indicates a likelihood of an abandonment of the online account above a predetermined threshold based on the account usage information and the user model;
   determining a first account action to take with the online account based on the likelihood and on the first state, wherein the first account action comprises an account feature offered to the user to prevent the abandonment of the online account;
   determining application interaction data by the user with the application, wherein the application interaction data comprises click-through navigation data of the user with the application;
   determining an electronic communication mechanism to convey the first account action to the user based on the application interaction data;
   transmitting the first account action to the user through the electronic communication mechanism;
   receiving an acceptance of the account feature; implementing the account feature with the online account on website associated with the service provider system; and
   activating an application feature of the application on the device based on the acceptance, wherein the application feature comprises a process for use with the account feature.

2. The service provider system of claim 1, wherein the first account action comprises an advertisement for the account feature for use with the online account based on the degree of usage of the online account.

3. The service provider system of claim 2, wherein the operations further comprise:
   determining a probability of adoption of the account feature by the user using the first state,
   wherein the account feature is determined based on the probability of adoption.

4. The service provider system of claim 2, wherein the account usage information comprises user information for the user, wherein the user information comprises at least one of user actions taken by the user using the online account, demographics of the user, past opt-ins by the user in features provided by the service provider system for the online account, currently used features by the user using the online account, or an amount of usage of the online account by the user, and wherein the account feature is determined using the user information.

5. The service provider system of claim 2, wherein the account feature comprises one of a renewal of the online account, an upgrade for the online account, a discount for the online account, a free return policy for the online account, a payment required after delivery for purchases made using the online account, an extendable credit for the use by the user with the online account, a mobile application download to access the service provider system or the online account, or a persistence based login option for the online account.

6. The service provider system of claim 1, wherein the determining the electronic communication mechanism further comprises determining a time to convey the first account action to the user, and wherein the transmitting the first account action to the user through the electronic communication mechanism occurs at the time.

7. The service provider system of claim 1, wherein the electronic communication mechanism is determined based on a statistical rate of viewing of each of a plurality of electronic communication mechanisms available for transmitting the first account action.

8. The service provider system of claim 1, wherein the first state for the user comprises one of an account usage rate by the user, a user status for the user based on a length of time since establishment of the online account, account lifecycle status data for the online account, or an opt-in rate for account features by the user compared to other users of the service provider system.

9. The service provider system of claim 1, wherein the operations further comprise:
    determining when to provide the first account action to the user based on the account usage information,
    wherein the first account action is determined in response to the determining when to provide the first account action to the user.

10. The service provider system of claim 9, wherein the determining when to provide the first account action to the user is further based on at least one of a likelihood rating to accept or adopt the first account action, a likelihood rating of loss of the user as a customer, a likelihood rating of closure of the online account by the user, or a lifecycle status for the online account.

11. The service provider system of claim 1, wherein the operations further comprise:
    receiving a cancelation of the first account action;
    determining a second state for the user based on the account usage information and the cancelation;
    determining a second account action to take with the online account using the second state; and
    communicating the second account action to the user using the electronic communication mechanism.

12. A method comprising:
    retrieving account information for an account of a user with a service provider, wherein the account information is associated with at least one of a used feature for the account utilized by the user or a usage rate of the account by the user, and wherein the account is accessible through an application on a device of the user;
    determining, based on the used feature and states of a plurality of other users, a user model associated with the user of the account;
    determining that the user model indicates a likelihood of an abandonment of the account above a predetermined threshold based on the account information and the user model;
    determining a recommendation for the user for a new feature for use with the account by the user based on the likelihood of the abandonment of the account, wherein the new feature is offered to the user to prevent the abandonment of the account, and wherein the new feature comprises an unused account feature available for use with the account;
    determining application interaction data by the user with the application, wherein the application interaction data comprises click-through navigation data of the user with the application;
    determining an electronic pathway to display the recommendation to the user based on the application interaction data;
    transmitting the recommendation to the user using the electronic pathway;
    receiving an acceptance of the new feature;
    implementing the new feature with the account on a website associated with the service provider; and
    activating an application feature of the application on the device based on the acceptance, wherein the application feature comprises a process for use with the new feature.

13. The method of claim 12, wherein prior to the determining the recommendation for the user, the method further comprises:
    determining a lifecycle point in account usage of the account by the user using the account information, wherein the account information comprises lifecycle data for a lifecycle of the account,
    wherein the recommendation is further determined based on the lifecycle point in account usage.

14. The method of claim 13, wherein the recommendation comprises an incentive for use of the account by the user.

15. The method of claim 13, wherein the recommendation comprises the new feature for the account based on a probability of adoption of the unused account feature for the user.

16. The method of claim 15, wherein the probability of adoption is based on statistical analysis of past user adoption rates of the unused account feature by the plurality of other users of the service provider.

17. The method of claim 12, wherein the account information comprises user specific viewing patterns for the user, and wherein the electronic pathway is determined based on the user specific viewing patterns.

18. The method of claim 17, wherein the user specific viewing patterns comprises at least one of a time of viewing each of a plurality of media sources, a length of viewing the each of the plurality of media sources, responses to advertisements from the each of the plurality of media sources, or user information integration with the each of the plurality of media sources.

19. A non-transitory machine-readable medium having stored thereon machine-readable instructions executable to cause a machine to perform operations comprising:
    retrieving account information for an account of a user with a service provider, wherein the account is accessible through an application on a device of the user;
    determining, based on states of a plurality of other users and the account information, a user model associated with the user of the account;
    determining that the user model indicates a likelihood of an abandonment of the account above a predetermined threshold based on the account information and the user model;
    determining a feature for use with the account by the user based on the determining that the user model indicates the likelihood of the abandonment of the account, wherein the feature is offered to the user to prevent the abandonment of the account, and wherein the feature is unused or unknown to the user;
    determining application interaction data by the user with the application, wherein the application interaction data comprises click-through navigation data of the user with the application;
    determining a communication channel to display a recommendation for the feature to the user based on at least one of the application interaction data or the account information;
    transmitting the recommendation to the user using the communication channel;
    receiving an acceptance of the feature; implementing the feature with a website associated with the service provider; and
    activating an application feature of the application on the device based on the acceptance, wherein the application feature comprises a process for use with the feature.

20. The non-transitory machine-readable medium of claim 19, wherein the communication channel comprises one of a webpage banner or advertisement for a webpage accessed by the user of the service provider, a checkout interface for a checkout process of the service provider used by the user, an email transmitted to the user, a dedicated application of the service provider used by the user, an online resource accessed by the user, or a messaging service used by the user.

\* \* \* \* \*